United States Patent
Abdulla

(10) Patent No.: US 8,732,418 B1
(45) Date of Patent: May 20, 2014

(54) SHADOW REGISTRY

(75) Inventor: Shameel Abdulla, Kerala (IN)

(73) Assignee: EMC Corporation, Hopkinton, MA (US)

(*) Notice: Subject to any disclaimer, the term of this patent is extended or adjusted under 35 U.S.C. 154(b) by 169 days.

(21) Appl. No.: 13/324,806

(22) Filed: Dec. 13, 2011

(51) Int. Cl.
*G06F 12/00* (2006.01)
*G06F 11/14* (2006.01)

(52) U.S. Cl.
CPC ........ *G06F 11/1456* (2013.01); *G06F 11/1451* (2013.01); *G06F 11/1461* (2013.01); *G06F 11/1448* (2013.01); *G06F 11/1435* (2013.01); *G06F 11/1458* (2013.01)
USPC .......................................... 711/162; 707/657

(58) Field of Classification Search
CPC ............ G06F 11/1456; G06F 11/1435; G06F 11/1451; G06F 11/2056; G06F 11/1461; G06F 11/1458; G06F 11/1448; G06F 11/1469; G06F 11/2082; G06F 11/2074
USPC ........................................... 711/162; 707/657
See application file for complete search history.

(56) References Cited

U.S. PATENT DOCUMENTS

| | | | |
|---|---|---|---|
| 8,028,158 B1* | 9/2011 | Streuter et al. ..................... 713/2 |
| 2004/0107199 A1* | 6/2004 | Dalrymple et al. ........... 707/100 |
| 2010/0280999 A1* | 11/2010 | Atluri et al. .................... 707/657 |
| 2012/0079326 A1* | 3/2012 | Riegel et al. ................. 714/38.1 |
| 2012/0117342 A1* | 5/2012 | Karonde et al. .............. 711/162 |

* cited by examiner

*Primary Examiner* — Hashem Farrokh
(74) *Attorney, Agent, or Firm* — Theodore A. Chen; Krishnendu Gupta; Ying Li

(57) ABSTRACT

This disclosure relates to a method, article of manufacture, and apparatus for backing up and restoring a registry. In some embodiments, this includes detecting one or more changes to a registry by a first thread of a backup application, wherein the backup application runs a plurality of threads, wherein a buffer is associated with each thread, generating a snapshot of the changes, storing the snapshot to the buffer associated with the first thread, synchronizing the first thread and one or more other threads in the plurality of the threads, and writing the snapshot from the buffer to a file.

11 Claims, 2 Drawing Sheets

SHADOW REGISTRY

FIELD

This invention relates generally to computer systems, and more particularly to systems and methods of backing up and restoring registries on computer systems.

BACKGROUND

A number of software applications exist for backing up and restoring computer systems. Such software applications are provided to facilitate recovery, at least to the most recent backup state, from a failure. Proper functioning of such software applications is vital to the backup and recovery of computer systems.

Part of the proper functioning of software applications depends on the data in a registry. The registry in some operating systems often contains critical information for software applications running on computer systems. Each entry in the registry is designated a key. Values associated with the key contain parameters, settings, and other configurations data for software applications and/or computer systems. Registry corruption may cause software applications or computer systems failure and prevent software applications performing any backup or recovery operation.

Although registry protection is critical, even complex backup software applications in existence today often have limited registry backup function. During a regular backup operation, registries associated with the backup software application are generally backed up along with other data on computer systems, i.e. a periodic backup. Because backup operations for the general purpose of backing up bulk data may take considerable periods of time and effort to complete, there may be certain periods wherein no backup operation records the most recent changes to certain data. When such data involves critical registry entries for backup software applications, a recovery of neither software applications nor the backup data to restore computer systems is possible.

There is a need, therefore, for an improved method or system that effectively backs up a registry to ensure the proper function and recovery of backup software applications running on computer systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
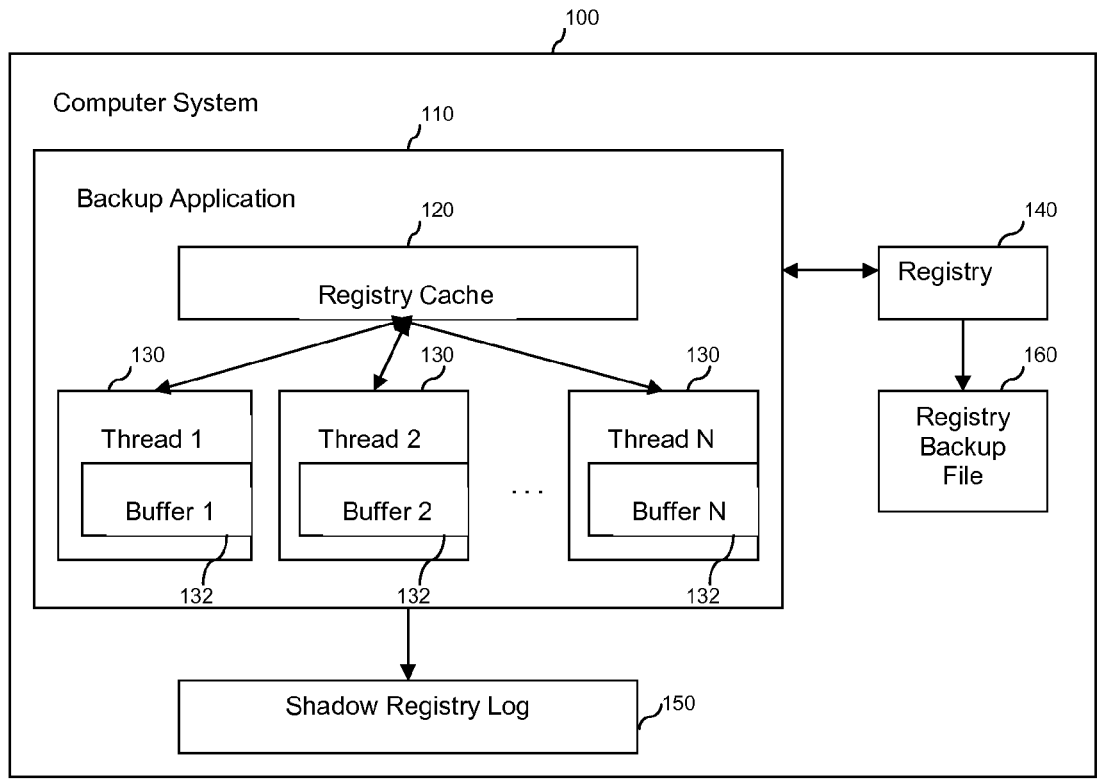
FIG. 1 is a diagram of a computer system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

FIG. 1 is a block diagram illustrating one embodiment of a computer system. Computer System 100 includes Backup Application 110, Registry 140, Registry Backup File 160, and Shadow Registry Log 150. Computer System 100 may include some hardware components configured to execute software instructions. By way of example, Backup Application 110 may be thought of as a collection of software instructions for implementing particular steps. Once installed, Backup Application 110 may be executed under a suitable operating system running on Computer System 100 to perform data backup function. Though FIG. 1 illustrates Backup Application 110 to be internal to Computer System 100, Backup Application 110 may reside and operate or be operated outside Computer System 100.

In some embodiments, Registry 140 may contain multiple entries storing application parameters, settings, and other configurations for Backup Application 110. Each entry in Registry 140 may be designated a key. Values associated with the key may store data relates to the proper functioning of Backup Application 110. Registry 140 corruption may cause Backup Application 110 failure and disrupt any data backup function performed by Backup Application 110.

By way of example, part of the data backup function performed by Backup Application 110 may be a periodical backup. During a periodical backup, Backup Application 110 may produce one or more copies of data from Computer System 100 as backups and store the backups to Computer System 100 and/or other storage devices. Along with backing up other data from Computer System 100, Backup Application 110 may also produce a copy of Registry 140 and store the copy to Registry Backup File 160 during a periodical backup. Registry Backup File 160 may be on Computer System 100 and/or other storage devices.

The storage device may be internal or external to Computer System 100. In some embodiments, an internal storage device may include one storage device or a plurality of storage devices. Similarly, in some embodiments, an external storage device may include one storage device or a plurality of storage devices. Further, these storage devices need not be physical. These storage devices may be virtual devices residing in a physical computer system, or may be a single virtual device residing across multiple physical computer systems.

In addition to conducting periodical backups, in the exemplary environment of FIG. 1, Backup Application 110 may also have a shadow registry function. A shadow registry operation may record every registry change to a file as Shadow Registry Log 150 and use the log for registry restoration. Different from Registry Backup File 160 generated during a periodical backup, Shadow Registry Log 150 may record all incremental changes made to Registry 140. Stated differently, Registry Backup File 160 may contain a full copy of Registry 140, but only at a specific point in time. In contrast, Shadow Registry Log 150 may contain incremental changes to Registry 140 at any point in time, including the time in between periodical backups. Thus, during Registry 140 recovery, analyzing and applying the records from Shadow Registry Log 150 to Registry Backup File 160 may restore Registry 140 to any point in time and ensure the proper function and recovery of Backup Application 110 running on Computer System 100.

To facilitate efficient shadow registry operation, in the exemplary system of FIG. 1, a copy of current Registry 140 entries may be stored in Registry Cache 120. Storing a copy in Registry Cache 120 may enable Backup Application 110 faster access to Registry 140 entry values. Once the backup operation performed by Backup Application 110 stops, Registry Cache 120 may be offloaded to conserve system resources.

In some embodiments, Backup Application 110 may run multiple threads to perform the shadow registry function. Each Thread 130 of the multi-threaded component within Backup Application may be associated with a buffer. Buffer 132 may be allocated as and when Thread 130 writes data to it. During Thread 130 execution, Buffer 132 may store all the changes made to Registry 140 by Thread 130. At the end of Thread 130 execution, Buffer 132 may be freed and all the data in Buffer 132 may be flushed to Shadow Registry Log 150.

Shadow Registry Log 150 in accord with some embodiments may be a file containing a collection of shadow registry records. The shadow registry records may be generated by the multi-threaded component within Backup Application 110. For example, during Thread 130 execution, Thread 130 may detect a change of an entry in Registry 140. A shadow registry record may be generated by Thread 130 to log the time of the change and the change to the entry. During Thread 130 execution, all such shadow registry records may be accumulated in Buffer 132 chronologically. At the end of Thread 130 execution, the shadow registry records in Buffer 132 may be flushed and written to Shadow Registry Log 150.

Using Buffer 240 during Thread 130 execution has several benefits. First, the buffer in the exemplary system of FIG. 1 may have little impact on Computer System 100 resource consumption. For example, the association of Buffer 240 to Thread 230 may be optimized by an operating system. When Thread 230 starts to write data to a buffer, a certain size of memory may be allocated as Buffer 240. When Thread 230 writes more data to Buffer 240, more memory may be allocated to Buffer 240 to accommodate the data growth. After Thread 230 reads data from Buffer 240 and writes to Shadow Registry Log 260, Buffer 240 may be freed. As a result, Buffer 240, as a staging area for shadow registry, has little impact on Computer System 100 resource consumption.

Second, using Buffer 240 as a staging area in a multi-thread configuration according to some embodiments minimizes the logging performance impact to Computer System 100. In the exemplary Computer System 100, a Buffer 240 is associated with each Thread 230. The recording to each Buffer 240 may be carried out simultaneously. The parallel multi-thread execution may improve efficiency. Further, although synchronized multiple Threads 230 eventually writes to a shared resource, Shadow Registry Log 260, during its execution, Buffer 240 as a staging area may reside in memory and hold all Registry 140 changes. Memory changes in accord with some embodiments generally take less time than direct file input/output (I/O) and may further improve efficiency. As a result, writing to Buffer 240 in a multi-threaded configuration in accordance with some embodiments reduces shadow registry logging performance impact to Computer System 100.

Figure 2:
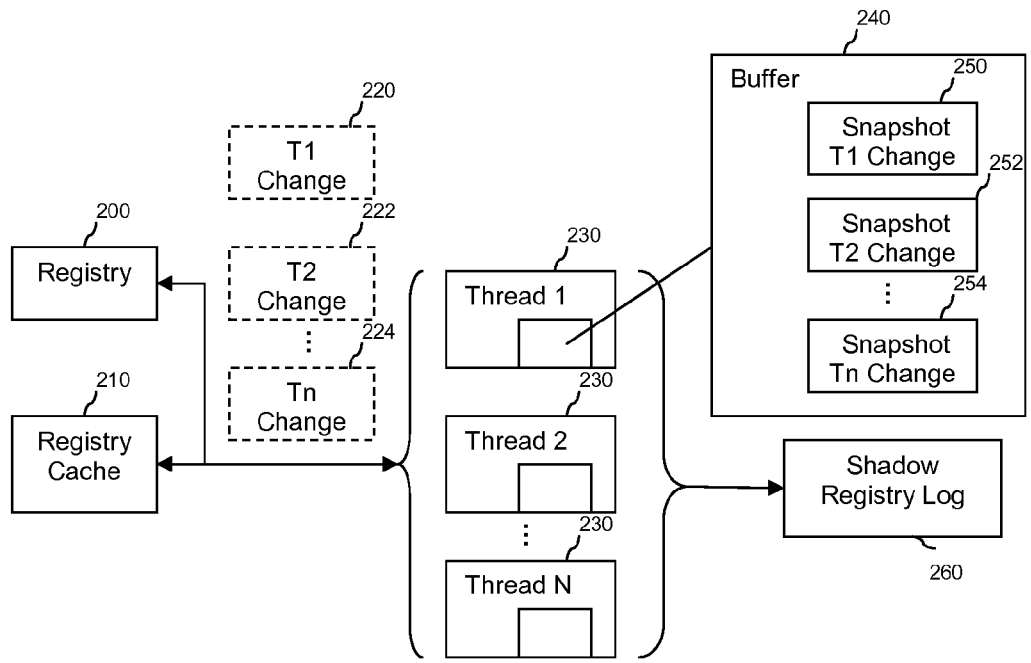
FIG. 2 is a diagram of a backup application in accordance with some embodiments.

FIG. 2 is a block diagram illustrating one embodiment of a backup application generating shadow registry records. In some embodiments, during Backup Application 110 execution, at time T1, Thread 230 may detect a change of a Registry 200 entry. T1 Change 220 may be determined by comparing the entry value in Registry 200 with a corresponding entry value in Registry Cache 210. Once Thread 230 detects a difference and determines a change has been made, Thread 230 may generate a snapshot of T1 Change 220 and store Snapshot T1 Change 250 in Buffer 240. Snapshot T1 Change may contain the timestamp T1 and the change made to the entry in Registry 200 at T1. Similarly, any subsequent changes T2 Change 222 . . . Tn Change 224 may also be detected and snapshots of subsequent changes may be generated and stored in Buffer 240 as Snapshot T2 Change 252, Snapshot Tn Change 254 etc. At the end of Thread 230 execution, Snapshot T1 Change 250, Snapshot T2 Change 252 . . . Snapshot Tn Change 254 may be written to Shadow Registry Log 260 in chronological order as shadow registry records and Buffer 240 may be freed to conserve system resources.

As used herein, a "snapshot" may be of a body of data to be backed up, or may be an incremental change in that body of data from an earlier snapshot or state. For example, a snapshot may correspond to a single write to a registry, or a number of writes to a registry, and may, but need not be, a snapshot of one or more of the following types: full copy, incremental, read-only, read/write, clone, copy-on-write, low-capacity, or split-mirror, for example. Each snapshot may be associated with the time or a representation of the time that the snapshot was created.

Figure 3:
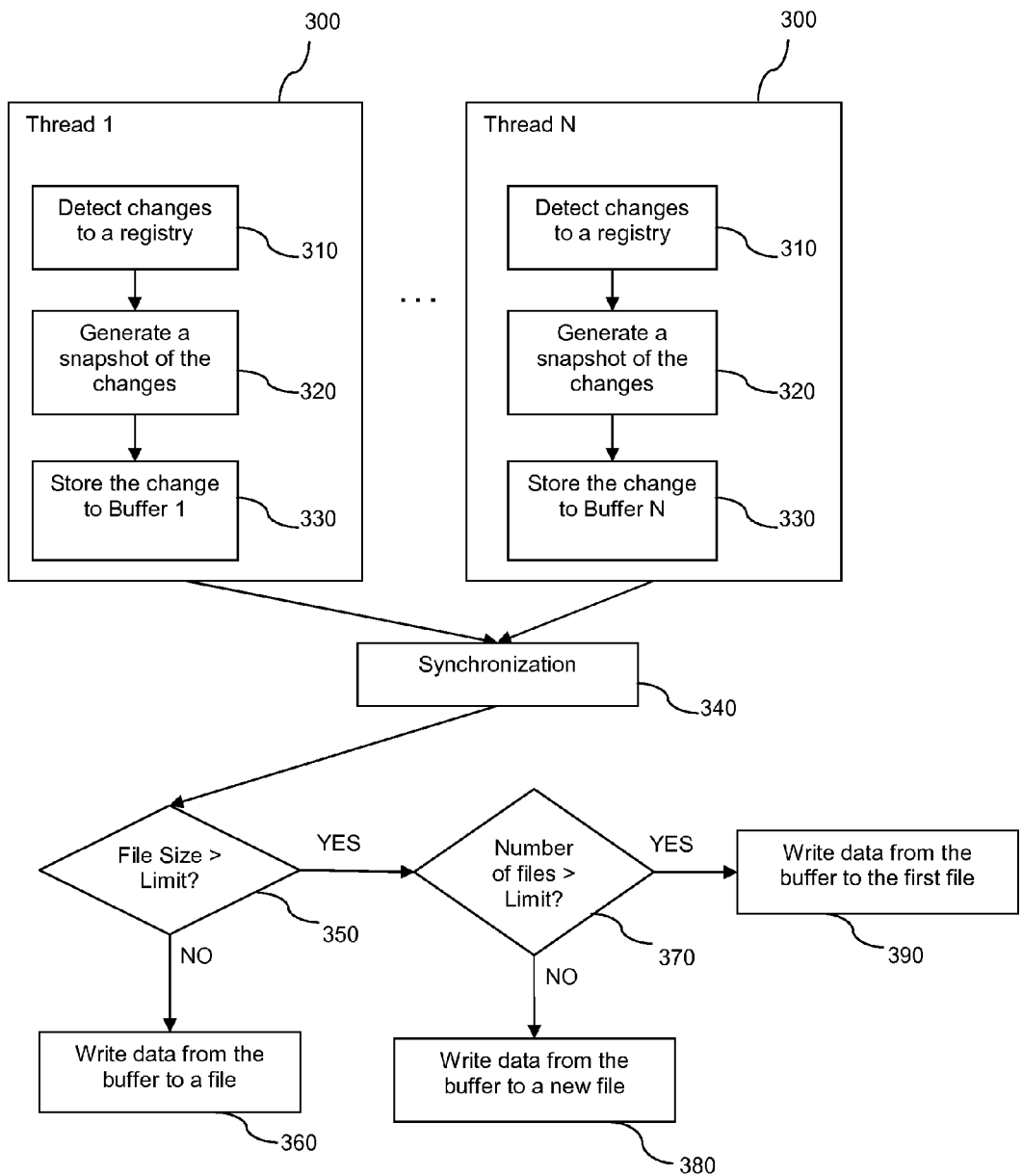
FIG. 3 is a flow chart of a method to shadow registry logging in accordance with some embodiments.

FIG. 3 illustrates a method of shadow registry for Registry 140 backup and recovery, in accordance with some embodiments. In step 310, Thread 300 may detect one or more changes to Registry 140 by comparing the value of an entry in Registry 140 with the value of a corresponding entry in Registry Cache 120. Upon determining one or more changes have been made, in step 320, Thread 300 may generate a snapshot of the changes. In step 330, the snapshot may be kept in a buffer associated with Thread 300 during its execution. Since there are multiple threads 300 running concurrently within Backup Application 110, step 340 synchronization is necessary to control access to the shared resource, Shadow Registry Log 150. At the end of Thread 300 execution, the synchronized write process may transfer all snapshots in a buffer associated with Thread 300 to Shadow Registry Log 150.

Generating snapshots for every change to Registry 140 in accordance with some embodiments may effectively back up Registry 140 to ensure the proper function and recovery of Backup Application 110 running on Computer System 100. The snapshot in step 320 may capture a registry entry change and the time of the change. A collection of snapshots in Shadow Registry Log 150 may record all changes made to Registry 140. The collection may be used to restore Registry 140 to the most recent backup state or any backup state even if Registry 140 corrupts and causes the failure of Backup Application 110.

For example, for data protection, Backup Application 110 runs periodical backups on Computer System 100. An entry HKEY_example with value of 0 in Registry 140 is critical to Backup Application 110 proper functioning. HKEY_example corruption may cause Backup Application 110 failure and interrupt any backup function performed by Backup Application 110. At time T0, a periodical backup performed by Backup Application 110 may back up data on Computer System 100. Along with the periodical backup at time T0, Backup Application 110 may also generate a copy of HKEY_example and stores the copy in Registry Backup File 160. Subsequently, two changes may occur at time T1 and T2. At time T1, the value of HKEY_1 may be changed to 1. And at time T2, the value of HKEY_example may be changed to 2. Both T1 and T2 may be points in time before the next scheduled periodical backup performed by Backup Application 110. By way of example, HKEY_example may be corrupted after time T2. As a result, Backup Application 110 may stop running after the corruption. Data protection for Computer System 100 may also be disrupted due to Backup Application 110 failure. To restore data protection performed by Backup Application 110, HKEY_example may need to be restored to its normal state such as the value of 1 or 2. Although solely relying on Registry Backup File 160 produced by a periodical backup may not restore HKEY_example to its most recent state at T2, applying Shadow Registry Log 150 to Registry Backup File 160 may enable the recovery of HKEY_example to not only the most recent state T2, but also to any point in time, i.e. T1. Thus, using snapshots in accordance with some embodiments may effectively back up Registry 140 to ensure the proper function and recovery of Backup Application 110 running on Computer System 100.

Though FIG. 1 depicts only one Shadow Registry Log 150, Computer System 100 may include multiple Shadow Registry Logs 150. In some embodiments, a circular logging method may be used to control disk usage by the group of Shadow Registry Logs 150. To limit the disk space used for shadow registry logging, two parameters may be set. First parameter may set Shadow Registry Log 150 file size limit. Second parameter may restrict the number of files in the group of Shadow Registry Logs 150. When all files in the group of Shadow Registry Logs 150 have reached the file size limit, in a circular fashion, next shadow registry records may be written to the first Shadow Registry Log 150.

Step 350 may first check if a current Shadow Registry Log 150 has grown to be too large. If the size of Shadow Registry Log 150 is reasonable and has not exceeded a file size limit, in step 360, all snapshots in a buffer may be written to the Shadow Registry Log 150. If the size of Shadow Registry Log 150 has exceeded the file size limit, the second parameter, number of files limit may be examined in step 370. If not too many files have been used as Shadow Registry Log 150, in step 380, next file may be used to write all snapshots from the buffer. On the other hand, if the group of Shadow Registry Logs 150 has reached the number of files limit, in a circular fashion, the first file in the group may be used to write data in step 390.

In some embodiments, restoring Registry 140 may restore Backup Application 110 to its normal state of operation, which in turn, may restore data protection on Computer System 100. Shadow Registry Log 150 may be used to trouble shoot Registry 140 and to restore Registry 140 to its most recent normal state of operation or to any point in time state of normal operation. For initial assessment, the number of shadow registry records in Shadow Registry Log 150 may give an indication of the magnitude of Registry 140 changes that happened in case of any anomalies.

In case of unexpected activities causing Registry 140 corruption, the number of shadow registry records in Shadow Registry Log 150 may be large. Shadow registry records may be inspected to identify the changes that may have caused Registry 140 corruption. Once the corruption causing changes are identified, a previous Registry 140 value corresponding to a Backup Application 110 normal state of operation may be traced backwards, since records in Shadow Registry Log 150 are in chronological order. Applying the previous Registry 140 value to Registry 140 may restore Registry 140 to its most recent normal state or any previous point in time state of normal operation.

In case the number of shadow registry records in Shadow Registry Log 150 is reasonable, both Registry Backup File 160 and Shadow Registry Log 150 may be used to restore Registry 140 to its most recent normal state. Registry Backup File 160 may be used to restore Registry 140 to its last periodical backup state. After restoring Registry 140 based on Registry Backup File 160, incremental changes since the last periodical backup may be applied to Registry 140 to enable any point in time recovery prior to corruption. Such incremental changes may be obtained from shadow registry records in Shadow Registry Log 150. Thus, combining Shadow Registry Log 150 with Registry Backup File 160 effectively enables restoration Registry 140 to the most recent state and ensures the proper functioning of Backup Application 110 running on Computer System 100.

An embodiment of the invention will be described with reference to a computer system configured to store registry data, but it should be understood that the principles of the invention are not limited to computer systems. Rather, they are applicable to any system capable of storing and handling various types of objects, in analog, digital, or other form. Although terms such as registry, document, file, object, etc. may be used by way of example, the principles of the invention are not limited to any particular form of representing and storing registry data or other information; rather, they are equally applicable to any object capable of representing information.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method to back up a registry, comprising:
    detecting one or more changes to the registry, wherein the one or more changes were made by a first thread of a backup application, the backup application runs a plurality of threads to perform a backup function, and the registry stores backup application configurations used to perform the backup function, and a buffer is associated with each of the plurality of threads;
    generating a snapshot of the one or more changes;
    storing the snapshot to the buffer associated with the first thread;
    determining whether a file size limit has been exceeded;
    if the file size limit has not been exceeded, then writing the snapshot from the buffer to a file within a group of files; and
    if the file size limit has been exceeded, then determining whether the number of files in the group of files has exceeded a number of files limit.

2. The method as recited in claim 1, wherein writing the snapshot from the buffer to a file includes synchronizing the first thread and one or more other threads in the plurality of the threads; and writing the snapshot from the buffer to a file.

3. The method as recited in claim 1, wherein determining whether the number of files in the group of files has exceeded a number of files limit includes
    if the number of files in the group of files has not exceeded the number of files limit, adding a new file to the group of files; writing the snapshot from the buffer to the new file; and
    if the number of files in the group of files has exceeded the number of files limit, writing the snapshot from the buffer to a first file in the group of files.

4. The method as recited in claim 1, wherein the backup application is associated with a registry cache, wherein the registry cache comprises a plurality of registry entries, and each of the plurality of registry entries stores the backup application configurations used to perform the backup function.

5. The method as recited in claim 4, wherein detecting one or more changes to the registry by a first thread of a backup application includes
    comparing the registry entries of the registry cache with corresponding entries in the registry.

6. A system for registry backup, comprising: a processor configured to
    detect one or more changes to a registry, wherein the one or more changes were made by a first thread of a backup application, the backup application runs a plurality of threads to perform a backup function, the registry stores backup application configurations used to perform the backup function, and a buffer is associated with each of the plurality of threads;
    generate a snapshot of the changes;
    store the snapshot to the buffer associated with the first thread;
    determine whether a file size limit has been exceeded;
    if the file size limit has not been exceeded, then write the snapshot from the buffer to a file within a group of files; and
    if the file size limit has been exceeded, then determine whether the number of files in the group of files has exceeded a number of files limit.

7. The system as recited in claim 6, wherein write the snapshot from the buffer to a file includes synchronize the first thread and one or more other threads in the plurality of the threads; and write the snapshot from the buffer to a file.

8. The system as recited in claim 6, wherein determine whether the number of files in the group of files has exceeded a number of files limit includes
    if the number of files in the group of files has not exceeded the number of files limit, add a new file to the group of files; write the snapshot from the buffer to the new file; and
    if the number of files in the group of files has exceeded the number of files limit, write the snapshot from the buffer to a first file in the group of files.

9. The system as recited in claim 6, wherein the backup application is associated with a registry cache, wherein the registry cache comprises a plurality of registry entries, and each of the plurality of registry entries stores the backup application configurations used to perform the backup function.

10. The system as recited in claim 9, wherein detect one or more changes to the registry by a first thread of a backup application includes
    compare the registry entries of the registry cache with corresponding entries in the registry.

11. A method to back up a registry, comprising:
    detecting one or more changes to the registry, wherein the one or more changes were made by a first thread of a backup application, the backup application runs a plurality of threads to perform a backup function, and the registry stores backup application configurations used to perform the backup function, and a buffer is associated with each of the plurality of threads;
    generating a snapshot of the one or more changes;
    storing the snapshot to the buffer associated with the first thread;
    writing the snapshot from the buffer to a file;
    wherein the backup application generates a copy of the registry; and restoring the registry, wherein restoring the registry includes determining if a size of the file has exceeded a limit;

if the size of the file has not exceeded the limit, then applying the copy of the registry to the registry; applying the file to the registry;

if the size of the file has exceeded the limit, then determining if a registry entry in the registry has been corrupted; if the registry entry has been corrupted, then identifying a previous value from the file; and applying the previous value to the registry entry.

\* \* \* \* \*